(12) United States Patent
Yoshimura

(10) Patent No.: US 12,540,412 B2
(45) Date of Patent: Feb. 3, 2026

(54) WATER ELECTROLYSIS CELL, METHOD OF PRODUCING WATER ELECTROLYSIS CELL

(71) Applicant: TOYOTA JIDOSHA KABUSHIKI KAISHA, Toyota (JP)

(72) Inventor: Joji Yoshimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 542 days.

(21) Appl. No.: 18/145,916

(22) Filed: Dec. 23, 2022

(65) Prior Publication Data

US 2023/0220569 A1    Jul. 13, 2023

(30) Foreign Application Priority Data

Jan. 12, 2022 (JP) ................................ 2022-002866

(51) Int. Cl.
| | | |
|---|---|---|
| C25B 11/032 | (2021.01) | |
| C25B 1/04 | (2021.01) | |
| C25B 11/061 | (2021.01) | |
| C25B 11/067 | (2021.01) | |

(52) U.S. Cl.
CPC .............. *C25B 11/032* (2021.01); *C25B 1/04* (2013.01); *C25B 11/061* (2021.01); *C25B 11/067* (2021.01)

(58) Field of Classification Search
None
See application file for complete search history.

(56) References Cited

U.S. PATENT DOCUMENTS

2015/0354072 A1 * 12/2015 Suchsland ........... H01M 8/0245
204/290.01

FOREIGN PATENT DOCUMENTS

| CN | 112513335 A | * | 3/2021 | .......... H01M 8/0232 |
| JP | H0417689 A | | 1/1992 | |
| JP | 2001342587 A | | 12/2001 | |
| KR | 20190021551 A | * | 3/2019 | .......... D01D 5/0015 |
| KR | 101972581 B1 | * | 4/2019 | .......... D01D 5/0015 |

OTHER PUBLICATIONS

Wang, Yunting, Yudong Xue, and Chunhui Zhang. "Rational surface and interfacial engineering of IrO2/TiO2 nanosheet arrays toward high-performance chlorine evolution electrocatalysis and practical environmental remediation." Small 17.17 (2021): 2006587 (Year: 2021).*

* cited by examiner

*Primary Examiner* — Louis J Rufo
(74) *Attorney, Agent, or Firm* — Hunton Andrews Kurth LLP

(57) ABSTRACT

Provided is a water electrolysis cell capable of suppressing a deterioration in performance even when a microporous layer is provided. A water electrolysis cell includes a solid polymer electrolyte membrane, a catalyst layer, a microporous layer, and a gas diffusion layer. The microporous layer includes a carrier made of an oxide containing at least one element selected from Ti, Mn, Co, Mo, Ru, W, Nb, and Ta, and a conductive material supported on the carrier.

8 Claims, 4 Drawing Sheets

WATER ELECTROLYSIS CELL, METHOD OF PRODUCING WATER ELECTROLYSIS CELL

CROSS-REFERENCE TO RELATED APPLICATION

This application claims priority to Japanese Patent Application No. 2022-002866 filed on Jan. 12, 2022, incorporated herein by reference in its entirety.

TECHNICAL FIELD

The present disclosure relates to a water electrolysis cell used for water electrolysis.

BACKGROUND

Patent Document 1 discloses use of two types of gas diffusion layers (GDL) having different void ratios and surface smoothness in an overlay manner. Specifically, adjustment thereof is performed by changing the void ratios and the smoothness with changed diameters of Ti fibers.

PRIOR ART DOCUMENTS

Patent Document

[Patent Document 1] JP-A-2001-342587

SUMMARY OF THE INVENTION

Problem to Be Solved by the Invention

A Ti fiber sintered body is sometimes used for a gas diffusion layer used in a water electrolysis cell. The Ti fiber sintered body tends to have large unevenness. Fibers of the sintered body locally crush a catalyst layer and further a solid polymer electrolyte membrane, and the solid polymer electrolyte membrane is thinned along the fibers, which results in a decrease in durability in some cases. Since the diameters of Ti fibers are about 20 μm, particularly when a thin solid polymer electrolyte membrane (20 μm or less) is used, its influence becomes large.

In order to suppress deformation of the catalyst layer and/or the solid polymer electrolyte membrane due to fibers of such a gas diffusion layer, there is a technique in which a microporous layer (MPL) is formed between the gas diffusion layer and the catalyst layer by coating. However, since a stable material constituting the MPL in a water electrolysis environment has low conductivity, the electric resistance of the water electrolysis cell is increased as a result, and the performance is deteriorated.

In view of the above problems, it is an object of the present disclosure to provide a water electrolysis cell capable of suppressing a deterioration in performance even when a microporous layer is provided.

Means for Solving the Problem

The present application discloses a water electrolysis cell including a solid polymer electrolyte membrane, a catalyst layer, a microporous layer, and a gas diffusion layer. The microporous layer includes a carrier made of an oxide containing at least one element selected from Ti, Mn, Co, Mo, Ru, W, Nb, and Ta, and a conductive material supported on the carrier.

The gas diffusion layer may be a Ti fiber sintered body.

The microporous layer may contain an ionomer in the proportion of 50% by mass or less.

The thickness of the microporous layer may be 20 μm or more and 100 μm or less.

The proportion of the conductive material may be 50% by mass or more with respect to the microporous layer.

The carrier is in a particulate form and may have an average particle diameter of 100 μm or less.

The carrier may be in a nanosheet form.

A method of producing the water electrolysis cell described above may include: formulating and making into ink a composition for the microporous layer; and coating the catalyst layer with the composition made into ink.

The method of producing the water electrolysis cell described above may include formulating and making into ink a composition for the microporous layer; coating a transfer sheet with the composition made into ink and drying the composition; and transferring the composition dried on the transfer sheet to the catalyst layer.

The method of producing the water electrolysis cell described above may include: formulating and making into ink a composition for the microporous layer; coating a transfer sheet with the composition made into ink and drying the composition; and transferring the composition dried on the transfer sheet to the gas diffusion layer.

Effect of the Invention

According to the present disclosure, it is possible to suppress a deterioration in performance even when a microporous layer is provided.

CONFIGURATION FOR IMPLEMENTING THE INVENTION

1. Water Electrolysis Cell

Figure 1:
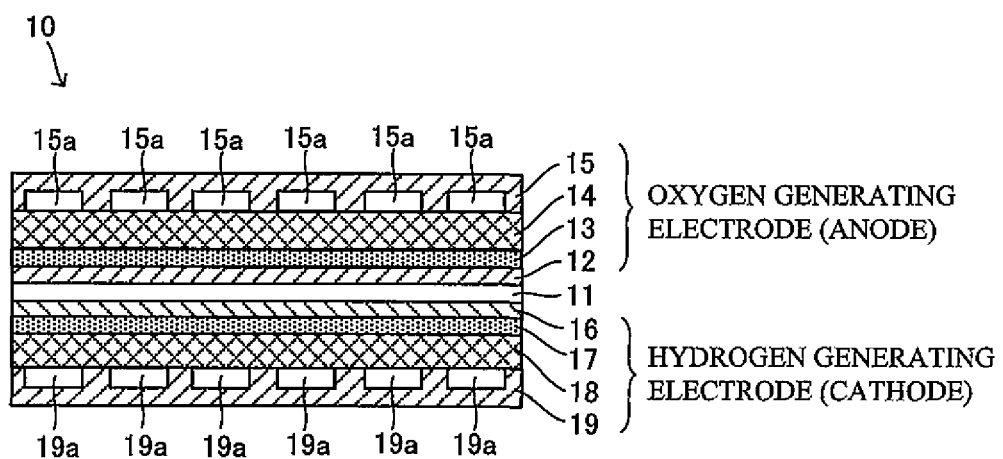
FIG. 1 is a conceptual diagram illustrating a configuration of a water electrolysis cell 10.

FIG. 1 conceptually shows a configuration of a water electrolysis cell 10. The water electrolysis cell 10 is a unit element for decomposing pure water into hydrogen and oxygen, and a plurality of such water electrolysis cells 10 are stacked to constitute a water electrolysis stack.

The water electrolysis cell 10 includes a plurality of layers, and one of them is an oxygen generating electrode (anode) and the other is a hydrogen generating electrode (cathode) with a solid polymer electrolyte membrane 11 interposed therebetween. In the anode, an anode catalyst layer 12, an anode microporous layer 13, an anode gas diffusion layer 14, and an anode separator 15 are stacked in this order from the side of the solid polymer electrolyte membrane 11. On the other hand, the cathode includes a cathode catalyst layer 16, a cathode microporous layer 17, a cathode gas diffusion layer 18, and a cathode separator 19 in this order from the side of the solid polymer electrolyte membrane 11.

1.1. Solid Polymer Electrolyte Membrane

A material (electrolyte) constituting the solid polymer electrolyte membrane 11 is a solid polymer material, and examples thereof include a proton conductive ion exchange membrane formed of a fluorine-based resin, a hydrocarbon-based resin material, or the like. This exhibits excellent proton conductivity (electrical conductivity) in a wet state. More specifically, a membrane made of Nafion (registered trademark), which is a perfluoro-based electrolyte, is included.

The thickness of the solid polymer electrolyte membrane is not particularly limited, but is 100 µm or less, is preferably 50 µm or less, and is more preferably 10 µm or less. In this configuration, the effect is particularly remarkable for a thin solid polymer electrolyte membrane.

1.2. Anode Catalyst Layer

The anode catalyst layer 12 is as known, but is a layer made of an electrocatalyst containing at least one or more noble metal catalysts, such as Pt, Ru, and Ir, and oxides thereof. More specifically, examples thereof include Pt, iridium oxide, ruthenium oxide, iridium ruthenium oxide, or a mixture thereof.

Examples of the iridium oxide include iridium oxide ($IrO_2$, $IrO_3$), iridium tin oxide, and iridium zirconium oxide.

Examples of the ruthenium oxide include ruthenium oxide ($RuO_2$, $Ru_2O_3$), ruthenium tantalum oxide, ruthenium zirconium oxide, ruthenium titanium oxide, and ruthenium titanium cerium oxide.

Examples of the iridium ruthenium oxide include iridium ruthenium cobalt oxide, iridium ruthenium tin oxide, iridium ruthenium iron oxide, and iridium ruthenium nickel oxide.

1.3. Anode Microporous Layer

The anode microporous layer 13 of the present disclosure is based on a function of retaining more moisture in the solid polymer electrolyte membrane by adjusting a component as necessary, or efficiently discharging oxygen generated by electrolysis of water, and further protects the solid polymer electrolyte membrane 11 and the anode catalyst layer 12 from deformation caused by the shape of the anode gas diffusion layer 14 while having conductivity.

The anode microporous layer 13 of this configuration includes a material in which a conductive material having electrical conductivity is supported on a carrier made of an oxide.

(Carrier)

It is desired that the oxide forming the carrier is an oxide that is inert and has low solubility in water and in an acidic environment. Specific examples thereof include an oxide containing at least one element selected from Ti, Mn, Co, Mo, Ru, W, Nb, and Ta. More specifically, examples of a Ti-based oxide include $K_2Ti_4O_9$ and $K_2La_2Ti_3O_{10}$, examples of an Nb-based oxide include $KNb_3O_8$, $K_4Nb_6O_{17}$, $KLaNb_2O_7$, and $KSr_2Nb_3O_{10}$, examples of a Ta-based oxide include $KSr_2Ta_4O_{10}$, examples of a TiNb-based oxide include $KTiNbO_5$, examples of a W-based oxide include $K_2W_2O_7$, and examples of another oxide include $KMO_2$ (here, M is at least one of Mn, Co, Mo, and Ru).

Further, an oxide having a photoreducing ability may be used as the oxide. With this, a conductive material can be supported on the oxide by photoreduction. Specifically, among the oxides exemplified above, $K_2Ti_4O_9$, $KTiNbO_5$, $K_4Nb_6O_{17}$, $KLaNb_2O_7$, and $KSr_2Ta_4O_{10}$ are applicable to this.

With the photoreducible oxide, when a solution in which the oxide and a precursor of a catalyst are dispersed is irradiated with light, electrons and holes are generated, and at that time, the conductive material is supported on the oxide by reacting the conductive material with the electrons and reducing the conductive material onto the oxide. Supporting by such a method can increase the support amount of the conductive material.

In order to suppress an increase in the flow resistance of water and generated oxygen, the above oxide forming the carrier is preferably in a particulate form, but it may be in a nanosheet form (two-dimensional structure having a thickness of 1 µm to 100 µm).

When the carrier is in a particulate form, the average particle diameter (D50) thereof is preferably 100 µm or less, and more preferably 10 µm or less. Thus, it is possible to suppress an increase in the flow resistance of gas-liquid. The "average particle diameter (D50)" is a value of a volume-based median diameter (D50) measured by laser diffraction-scattering particle size distribution measurement unless otherwise noted. The median diameter (D50) is a diameter (volume average diameter) in which the cumulative volume of particles becomes half (50%) of the whole when the particles are arranged in ascending order of particle diameters.

On the other hand, in the case of a nanosheet form, the length of the longest portion of the layer surface is twice or more the layer thickness, and the carrier may be a layered body having a length, for example, 10 times or more or 50 times or more. Here, to make sure that the carrier has a nanosheet form, it is only necessary to confirm that it has a layered crystal structure by X-ray diffraction (XRD) measurement or the like.

(Conductive Material)

As the conductive material contained in the anode microporous layer 13 and supported on the carrier made of the above oxide, particles having conductivity can be used, and examples thereof include platinum (Pt), iridium (Ir) and oxides thereof, and ruthenium (Ru) and oxides thereof.

Examples of the iridium oxide include iridium oxide ($IrO_2$, $IrO_3$), iridium tin oxide, and iridium zirconium oxide.

Examples of the ruthenium oxide include ruthenium oxide ($RuO_2$, $Ru_2O_3$), ruthenium tantalum oxide, ruthenium zirconium oxide, ruthenium titanium oxide, and ruthenium titanium cerium oxide.

Examples of the iridium ruthenium oxide include iridium ruthenium cobalt oxide, iridium ruthenium tin oxide, iridium ruthenium iron oxide, and iridium ruthenium nickel oxide.

The content ratio of the conductive material is preferably 50% by mass or more with respect to the anode microporous layer 13. Thus, it is possible to reliably suppress a decrease in conductivity.

(Others)

It is preferable that the thickness of the anode microporous layer 13 is as thin as possible within a range thicker than the fiber diameter of fibrous Ti contained in the anode gas diffusion layer 14 described next. Thus, deformation or breakage of the solid polymer electrolyte membrane 11 and the anode catalyst layer 12 due to the fibrous Ti can be suppressed. More specifically, the thickness of the anode microporous layer 13 is preferably 20 µm or more and 100 µm or less.

Here, the anode microporous layer 13 may contain an ionomer in the proportion of 50% by mass or less. By containing an ionomer, in addition to improvement of coatability, permeation of water supplied during water decomposition can be smoothly performed due to its hydrophilicity.

Examples of the ionomer contained herein include an ionomer composed of a perfluoro-based electrolyte that is an electrolyte used in a solid polymer electrolyte membrane.

1.4. Anode Gas Diffusion Layer

The anode gas diffusion layer 14 is constituted by a member having gas permeability and conductivity, a known one may be used without any particular limitation, and specific examples thereof include a porous conductive member made of metal fibers, metal particles, or the like.

Among them, a configuration in which fibrous Ti is formed by overlapping like a nonwoven fabric as in this configuration can be applied. Specifically, a titanium fiber sintered body can be used as the anode gas diffusion layer. This makes it difficult to corrode in a severe corrosive environment during water electrolysis, which is excellent in durability.

Although an aspect of the titanium fiber sintered body is not particularly limited, and a known one can be used, the thickness thereof is 100 μm or more, and preferably 500 μm or less. Further, the void ratio is preferably 30% or more, and the fiber diameter is 10 μm or more, and preferably 100 μm or less. In addition, a Pt coating may be provided on a titanium fiber.

1.5. Anode Separator

The anode separator 15 is a member including channels 15a through which pure water is supplied to the anode gas diffusion layer 14 and generated oxygen is discharged. There is no particular limitation as long as it is such an anode separator, and a known one can be used.

1.6. Cathode Catalyst Layer

As the catalyst contained in the cathode catalyst layer 16, a known catalyst can be used, and examples thereof include platinum, platinum-coated titanium, platinum-supporting carbon, palladium-supporting carbon, cobalt glyoxime, and nickel glyoxime.

1.7. Cathode Microporous Layer

The cathode microporous layer 17 is also a layer having a function of retaining more moisture in the solid polymer electrolyte membrane by adjusting a component as necessary, or efficiently discharging excess moisture and hydrogen generated by electrolysis of water.

As the cathode microporous layer 17 of this configuration, a known one can be used, and a water-repellent resin such as polytetrafluoroethylene (PTFE) and a conductive material such as carbon black can be used as a main component. However, the use of the material used for the anode microporous layer 13 described above is not prevented in the cathode microporous layer 17.

1.8. Cathode Gas Diffusion Layer

The cathode gas diffusion layer 18 is constituted by a member having gas permeability and conductivity. In this configuration, a known cathode gas diffusion layer can be used, and specific examples thereof include a porous member such as carbon cloth and carbon paper. Note that since oxidation hardly occurs at the cathode, carbon can be used in this manner, but having the same configuration as that of the anode gas diffusion layer 14 described above is not prevented.

1.9. Cathode Separator

The cathode separator 19 is a member including channels 19a through which separated hydrogen and accompanying water flow, and a known one can be used.

1.10. Hydrogen Generation by Water Electrolysis Cell

Hydrogen is generated from pure water by the water electrolysis cell 10 described above as follows. Accordingly, the water electrolysis cell and the water electrolysis stack of the present disclosure can be provided with known members and configurations necessary for generating hydrogen in addition to the above.

Pure water ($H_2O$) supplied from the channels 15a of the anode separator 15 to the anode (oxygen generating electrode) is decomposed into oxygen, electrons, and protons ($H^+$) in the anode catalyst layer 12 that has been subjected to a potential by energizing between the anode and the cathode. At this time, the protons move through the solid polymer electrolyte membrane 11 to the cathode catalyst layer 16. On the other hand, the electrons separated in the anode catalyst layer 12 pass through an external circuit and reach the cathode catalyst layer 16. Then, in the cathode catalyst layer 16, the protons accept the electrons, and hydrogen ($H_2$) is generated. The generated hydrogen reaches the cathode separator 19 and is discharged from the channels 19a. Note that oxygen separated in the anode catalyst layer 12 reaches the anode separator 15 and is discharged from the channels 15a.

The supply of water from the anode separator 15 to the anode catalyst layer 12 and the discharge of water and generated oxygen from the anode catalyst layer 12 to the anode separator 15 are appropriately performed by the anode microporous layer 13 and the anode gas diffusion layer 14, which function as a flow path disposed in the middle thereof.

On the other hand, hydrogen generated in the cathode catalyst layer 16 and water which has permeated through the solid polymer electrolyte membrane 11, accompanying the protons, permeate through the cathode microporous layer 17 and the cathode gas diffusion layer 18, which function as a flow path, to appropriately reach the cathode separator 19.

2. Production Method

2.1. Configuration 1

Figure 2:
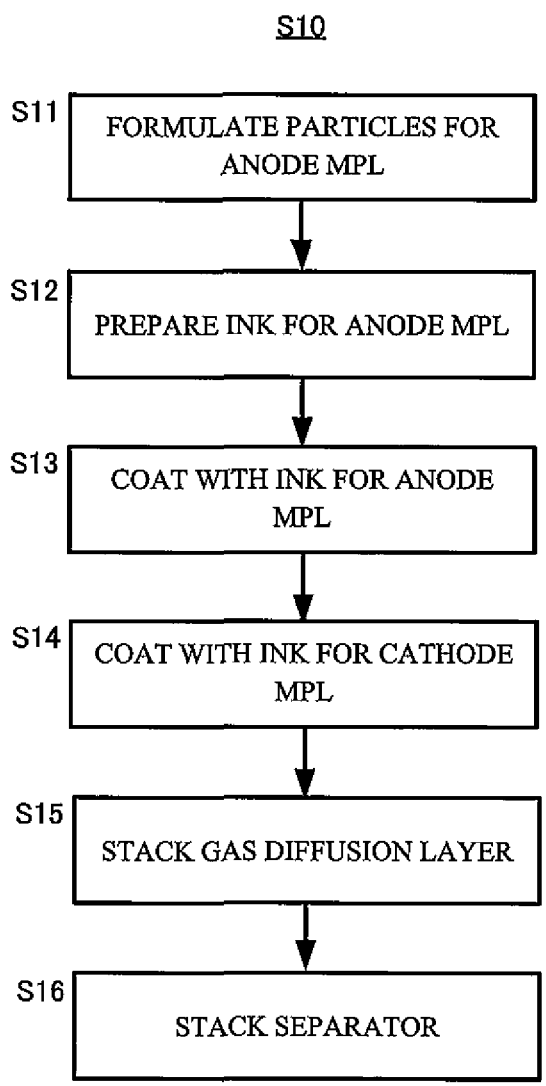
FIG. 2 is a diagram illustrating a production method S10 of the water electrolysis cell 10.

Production of the water electrolysis cell 10 as described above can be performed, for example, as follows. FIG. 2 shows a flow of a production method S10 of the water electrolysis cell 10 according to one configuration. Each step is as follows:

In the production method S10, a membrane electrode assembly for water electrolysis in which the anode catalyst layer 12 is stacked on one surface of the solid polymer electrolyte membrane 11 and the cathode catalyst layer 16 is stacked on the other surface is prepared in advance by a known method.

In step S11, a conductive material is supported on an oxide as a carrier. The method of supporting may be a known method and may be performed in a solution. In addition, when the oxide acts as a photocatalyst, it can perform support by photoreduction.

The conductive-material supporting oxide formed in the solution is filtered and dried to obtain particles for an anode microporous layer.

In step S12, an ionomer made of an electrolyte and the particles obtained in step S11 are mixed with a primary alcohol, a secondary or higher alcohol, and water to be dispersed, thereby obtaining an ink for an anode microporous layer. Here, examples of the primary alcohol include ethanol, 1-propanol, and 1-butanol, and examples of the secondary or higher alcohol include 2-propanol and t-butyl alcohol. Further, the electrolyte is not particularly limited, but is one having proton conductivity, and examples thereof include the same as the electrolyte of the solid polymer electrolyte membrane 11.

In step S13, the anode catalyst layer 12 stacked on the solid polymer electrolyte membrane 11 is coated with the ink for an anode microporous layer obtained in step S12 by a coating method such as spraying, and the ink is dried to obtain the anode microporous layer 13.

In step S14, the cathode catalyst layer 16 stacked on the solid polymer electrolyte membrane 11 is coated with a commercially available ink for a cathode microporous layer by a coating method such as spraying, and the ink is dried to obtain the cathode microporous layer 17.

In step S15, the anode gas diffusion layer 14 is stacked on the anode microporous layer 13 of the stack obtained up to step S14, the cathode gas diffusion layer 18 is stacked on the cathode microporous layer 17 of the stack obtained up to step S14, and they are pressed.

In step S16, the anode separator 15 is stacked on the anode gas diffusion layer 14 of the stack obtained up to step S15, the cathode separator 19 is stacked on the cathode gas diffusion layer 18 of the stack obtained up to step S15, and they are pressed.

2.2. Configuration 2

Figure 3:
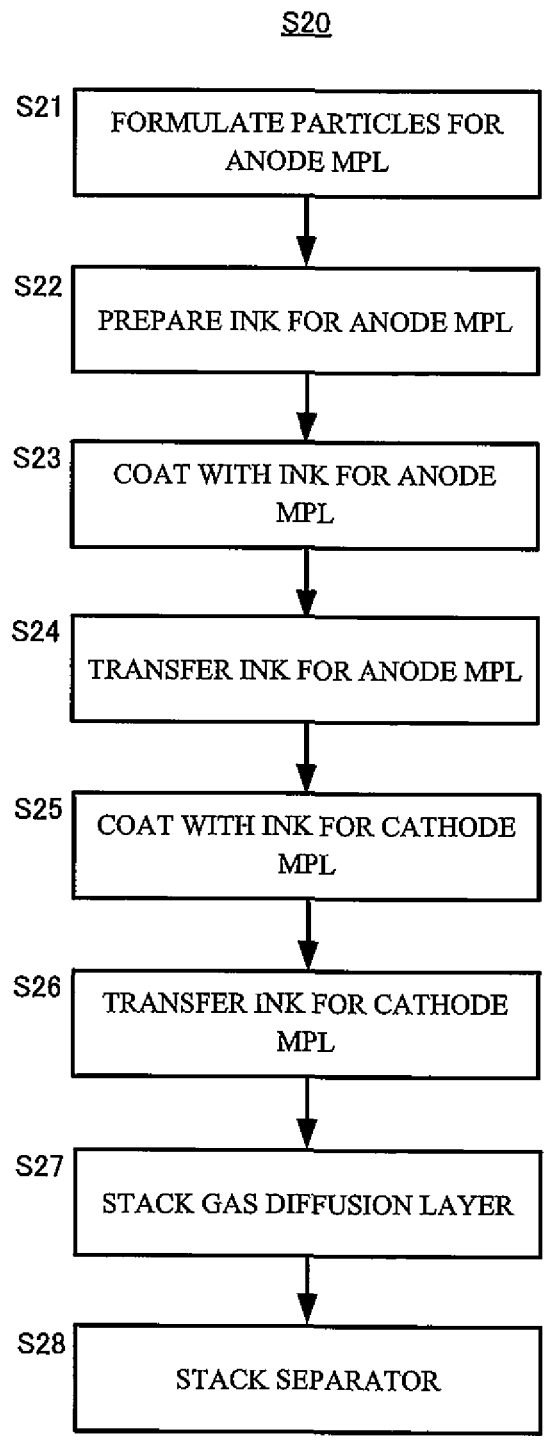
FIG. 3 is a diagram illustrating a production method S20 of the water electrolysis cell 10.

FIG. 3 shows a flow of a production method S20 of the water electrolysis cell 10 according to another configuration. Each step is as follows:

In the production method S20, a membrane electrode assembly for water electrolysis in which the anode catalyst layer 12 is stacked on one surface of the solid polymer electrolyte membrane 11 and the cathode catalyst layer 16 is stacked on the other surface is prepared in advance by a known method.

In step S21, a conductive material is supported on an oxide as a carrier. The method of supporting may be a known method and may be performed in a solution. In addition, when the oxide acts as a photocatalyst, it can perform support by photoreduction.

The conductive-material supporting oxide formed in the solution is filtered and dried to obtain particles for an anode microporous layer.

In step S22, an ionomer made of an electrolyte and the particles obtained in step S21 are mixed with a primary alcohol, a secondary or higher alcohol, and water to be dispersed, thereby obtaining an ink for an anode microporous layer. Here, examples of the primary alcohol include ethanol, 1-propanol, and 1-butanol, and examples of the secondary or higher alcohol include 2-propanol and t-butyl alcohol. Further, the electrolyte is not particularly limited, but is one having proton conductivity, and examples thereof include the same as the electrolyte of the solid polymer electrolyte membrane 11.

In step S23, a PTFE sheet is coated with the ink for an anode microporous layer obtained in step S22 by a coating method such as spraying, and the ink is dried to obtain a transfer sheet for an anode microporous layer.

In step S24, the transfer sheet for an anode microporous layer obtained in step S23 is stacked on the anode catalyst layer 12 stacked on the solid polymer electrolyte membrane 11 to transfer the anode microporous layer 13.

In step S25, a PTFE sheet is coated with a commercially available ink for a cathode microporous layer by a coating method such as spraying, and the ink is dried to obtain a transfer sheet for a cathode microporous layer.

In step S26, the transfer sheet for a cathode microporous layer obtained in step S25 is stacked on the cathode catalyst layer 16 stacked on the solid polymer electrolyte membrane 11 to transfer the cathode microporous layer 17.

In step S27, the anode gas diffusion layer 14 is stacked on the anode microporous layer 13 of the stack obtained up to step S26, the cathode gas diffusion layer 18 is stacked on the cathode microporous layer 17 of the stack obtained up to step S26, and they are pressed.

In step S28, the anode separator 15 is stacked on the anode gas diffusion layer 14 of the stack obtained up to step S27, the cathode separator 19 is stacked on the cathode gas diffusion layer 18 of the stack obtained up to step S27, and they are pressed.

2.3. Configuration 3

Figure 4:
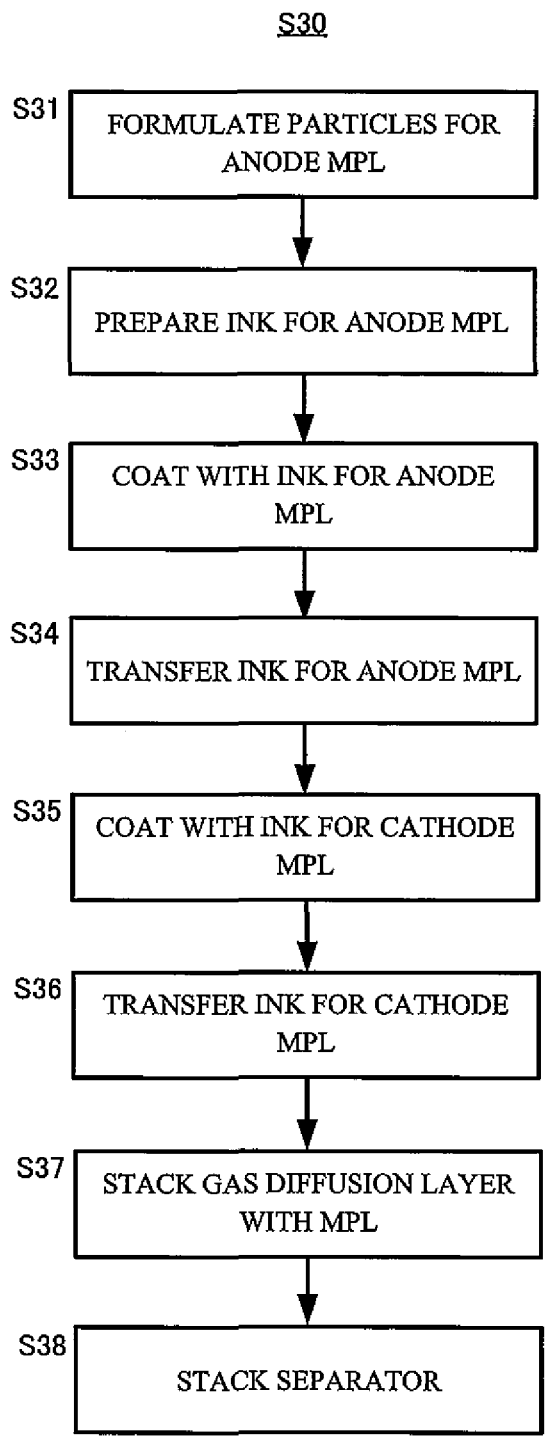
FIG. 4 is a diagram illustrating a production method S30 of the water electrolysis cell 10.

FIG. 4 shows a flow of a production method S30 of the water electrolysis cell 10 according to another configuration. Each step is as follows:

In the production method S30, a membrane electrode assembly for water electrolysis in which the anode catalyst layer 12 is stacked on one surface of the solid polymer electrolyte membrane 11 and the cathode catalyst layer 16 is stacked on the other surface is prepared in advance by a known method.

In step S31, a conductive material is supported on an oxide as a carrier. The method of supporting may be a known method and may be performed in a solution. In addition, when the oxide acts as a photocatalyst, it can perform support by photoreduction.

The conductive-material supporting oxide formed in the solution is filtered and dried to obtain particles for an anode microporous layer.

In step S32, an ionomer made of an electrolyte and the particles obtained in step S31 are mixed with a primary alcohol, a secondary or higher alcohol, and water to be dispersed, thereby obtaining an ink for an anode microporous layer. Here, examples of the primary alcohol include ethanol, 1-propanol, and 1-butanol, and examples of the secondary or higher alcohol include 2-propanol and t-butyl alcohol. Further, the electrolyte is not particularly limited, but is one having proton conductivity, and examples thereof include the same as the electrolyte of the solid polymer electrolyte membrane 11.

In step S33, a PTFE sheet is coated with the ink for an anode microporous layer obtained in step S32 by a coating method such as spraying, and the ink is dried to obtain a transfer sheet for an anode microporous layer.

In step S34, the transfer sheet for an anode microporous layer obtained in step S33 is stacked on a sheet serving as the anode gas diffusion layer 14, and a layer serving as the anode microporous layer is transferred to the sheet serving as the anode gas diffusion layer 14.

In step S35, a PTFE sheet is coated with a commercially available ink for a cathode microporous layer by a coating method such as spraying, and the ink is dried to obtain a transfer sheet for a cathode microporous layer.

In step S36, the transfer sheet for a cathode microporous layer obtained in step S35 is stacked on a sheet serving as the cathode gas diffusion layer 18, and a layer serving as the cathode microporous layer is transferred to the sheet serving as the cathode gas diffusion layer 18.

In step S37, the anode gas diffusion layer 14 with the anode microporous layer obtained in step S34 is stacked on the anode catalyst layer 12 of the membrane electrode assembly for water electrolysis, the cathode gas diffusion layer 18 with the cathode microporous layer obtained in step S36 is stacked on the cathode catalyst layer 16 of the membrane electrode assembly for water electrolysis, and they are pressed.

In step S38, the anode separator 15 is stacked on the anode gas diffusion layer 14 of the stack obtained up to step S37, the cathode separator 19 is stacked on the cathode gas diffusion layer 18 of the stack obtained up to step S37, and they are pressed.

3. Effects and the Like

When a material having large unevenness and/or an exposed end portion of fibers is used, for example, when a Ti fiber sintered body is used in a gas diffusion layer in a water electrolytic electrode, a catalyst layer and further a solid polymer electrolyte membrane may be crushed, and the solid polymer electrolyte membrane may be locally thinned along the fibers, resulting in a problem. In particular, since Ti fibers have a diameter of about 20 μm, when a thin solid polymer electrolyte membrane (e.g., 20 μm or less) is used, its influence becomes large.

Therefore, there is a technology of coating a microporous layer from the viewpoint of suppressing deformation of a membrane by fibers, but this has a problem that because the conductivity is low under a water electrolysis environment, the electrical resistance of the water electrolysis cell rises, and the performance deteriorates as a result.

In contrast, with the present disclosure, the microporous layer including the conductive material ensures the increased conductivity in the microporous layer and the suppressed electrical resistance of the water electrolysis cell to a low level, thereby making it possible to suppress a decrease in performance.

DESCRIPTION OF SYMBOLS

10 Water electrolysis cell
11 Solid polymer electrolyte membrane
12 Anode catalyst layer (oxygen generating electrode side catalyst layer)
13 Anode microporous layer
14 Anode gas diffusion layer
15 Anode separator
16 Cathode catalyst layer (hydrogen generating electrode side catalyst layer)
17 Cathode microporous layer
18 Cathode gas diffusion layer
19 Cathode separator

What is claimed is:

1. A water electrolysis cell comprising:
a solid polymer electrolyte membrane;
a catalyst layer;
a microporous layer; and
a gas diffusion layer,
wherein the microporous layer includes:
a carrier made of an oxide containing at least one element selected from Ti, Mn, Co, Mo, Ru, W, Nb, and Ta;
a conductive material supported on the carrier; and
the microporous layer contains an ionomer in a proportion of 50% by mass or less.

2. The water electrolysis cell according to claim 1, wherein the gas diffusion layer is a Ti fiber sintered body.

3. The water electrolysis cell according to claim 1, wherein a thickness of the microporous layer is 20 μm or more and 100 μm or less.

4. The water electrolysis cell according to claim 1, wherein a proportion of the conductive material is 50% by mass or more with respect to the microporous layer.

5. The water electrolysis cell according to claim 1, wherein the carrier is in a particulate form and has an average particle diameter of 100 μm or less.

6. The water electrolysis cell according to claim 1, wherein the carrier is in a nanosheet form.

7. A method of producing the water electrolysis cell according to claim 1, comprising:
formulating and making into ink a composition for the microporous layer; and
coating the catalyst layer with the composition made into ink.

8. A method of producing the water electrolysis cell according to claim 1, comprising:
formulating and making into ink a composition for the microporous layer;
coating a transfer sheet with the composition made into ink and drying the composition; and
transferring the composition dried on the transfer sheet to the catalyst layer or the gas diffusion layer.

* * * * *